United States Patent
Sames

(10) Patent No.: US 8,747,192 B2
(45) Date of Patent: Jun. 10, 2014

(54) APPARATUS FOR PICKING UP AND GUIDING LOOPS

(75) Inventor: Jörg Sames, Alten Büseck (DE)

(73) Assignee: Poly-clip System GmbH & Co. KG, Hattersheim (DE)

( * ) Notice: Subject to any disclaimer, the term of this patent is extended or adjusted under 35 U.S.C. 154(b) by 595 days.

(21) Appl. No.: 10/892,389

(22) Filed: Jul. 15, 2004

(65) Prior Publication Data

US 2005/0042061 A1 Feb. 24, 2005

(30) Foreign Application Priority Data

Jul. 16, 2003 (DE) .................... 103 32 330

(51) Int. Cl.
- B65G 47/36 (2006.01)
- A22C 11/00 (2006.01)
- A22C 15/00 (2006.01)

(52) U.S. Cl.
USPC .......................................................... 452/51

(58) Field of Classification Search
USPC .................... 414/27; 452/51; 52/51
See application file for complete search history.

(56) References Cited

U.S. PATENT DOCUMENTS

| | | | | |
|---|---|---|---|---|
| 2,624,880 | A * | 1/1953 | Lind et. al. | 221/299 |
| 3,499,518 | A * | 3/1970 | Goodpaster | 198/465.4 |
| 4,091,505 | A * | 5/1978 | Muller et al. | 452/47 |
| 4,345,411 | A * | 8/1982 | Niedecker | 53/134.1 |
| 4,612,684 | A * | 9/1986 | Kollross | 452/35 |
| 5,082,419 | A | 1/1992 | Kollross et al. | |
| 5,100,364 | A * | 3/1992 | Kollross et al. | 452/185 |
| 5,664,659 | A * | 9/1997 | Gaertner | 198/360 |
| 5,772,499 | A * | 6/1998 | Niedecker | 452/185 |
| 6,056,636 | A * | 5/2000 | Cody et al. | 452/51 |
| 6,419,077 | B1 * | 7/2002 | White et al. | 198/468.6 |
| 6,786,321 | B2 * | 9/2004 | Borkiewicz et al. | 198/419.3 |
| 6,786,813 | B2 * | 9/2004 | Shefet et al. | 452/51 |
| 6,869,353 | B2 * | 3/2005 | Kasai | 452/186 |
| 7,942,728 | B2 * | 5/2011 | Sames | 452/51 |
| 2004/0084283 | A1 * | 5/2004 | Borkiewicz et al. | 198/678.1 |
| 2004/0142650 | A1 * | 7/2004 | Stimpfl | 452/32 |
| 2005/0042979 | A1 * | 2/2005 | Sames | 452/51 |

FOREIGN PATENT DOCUMENTS

| | | | | |
|---|---|---|---|---|
| DE | 34 37 830 A1 | 4/1986 | | |
| DE | 3437830 A * | 4/1986 | | A22C 15/00 |
| DE | 3806467 C * | 5/1989 | | A22C 11/00 |

(Continued)

*Primary Examiner* — James Keenan
(74) *Attorney, Agent, or Firm* — Hahn Loeser & Parks LLP

(57) ABSTRACT

The invention concerns an apparatus for picking up and guiding loops or the like which can be applied to articles, in particular sausage-shaped packs, comprising a loop feed means, an angled pick-up means having a front end, a pin which has a contact surface and which is movable between a first position in which it passes through the fed loop and in which the contact surface is in contact with the front end of the pick-up means, and a second position away from the front end of the pick-up means, and a drive for actuation of the contact pin. A torque support means is provided in the front region of the front end of the pick-up means and the contact surface of the pin has means for centering the pick-up means in such a way that the pick-up means does not bear against the torque support means when the pin is in the first position.

10 Claims, 4 Drawing Sheets

(56) References Cited

FOREIGN PATENT DOCUMENTS

Figure 1:
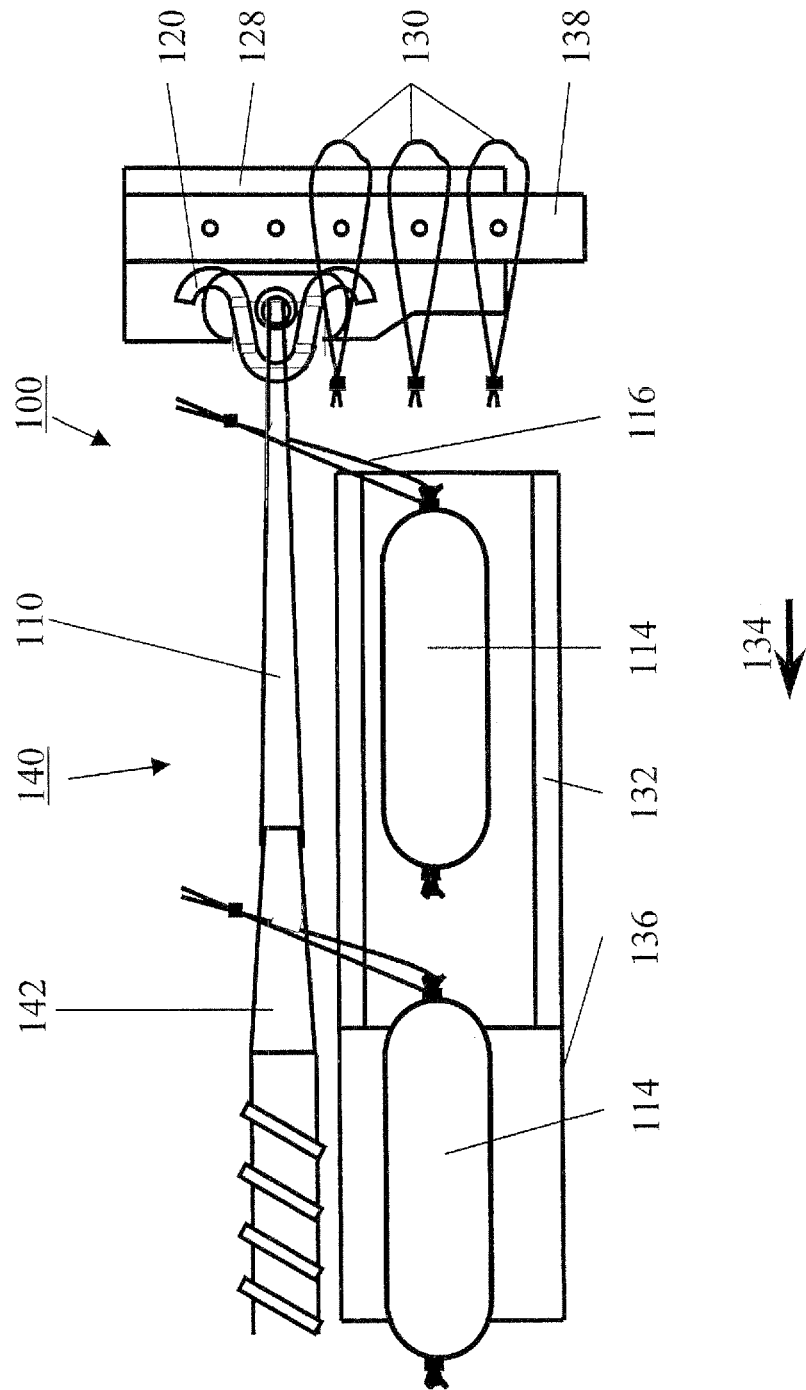

| DE | 38 06 467 C1 | 11/1989 | | |
|---|---|---|---|---|
| DE | 10046417 C | * 3/2002 | ............. | A22C 15/00 |
| EP | 377090 A1 | * 7/1990 | ............. | A22C 15/00 |
| EP | 0 330 857 B1 | 7/1991 | | |
| EP | 1518461 A | * 3/2005 | ............. | A22C 15/00 |
| FR | 2650482 A1 | * 2/1991 | ............. | A22C 15/00 |
| JP | 03160942 A | * 7/1991 | ............. | A22C 15/00 |
| JP | 04252137 A | * 9/1992 | ............. | A22C 15/00 |
| RU | 2001859 | 10/1993 | | |
| WO | WO 00/25591 A1 | * 5/2000 | ............. | A22C 11/00 |

* cited by examiner

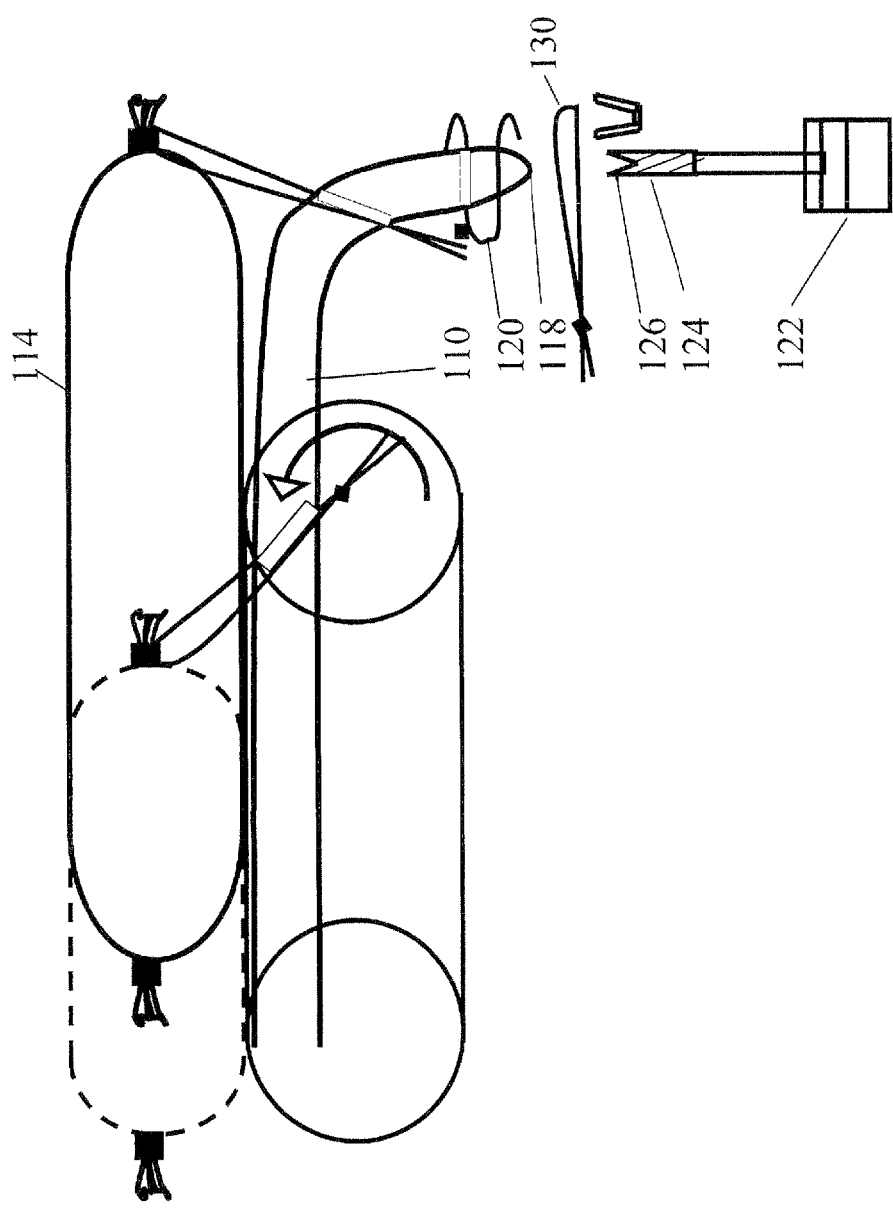
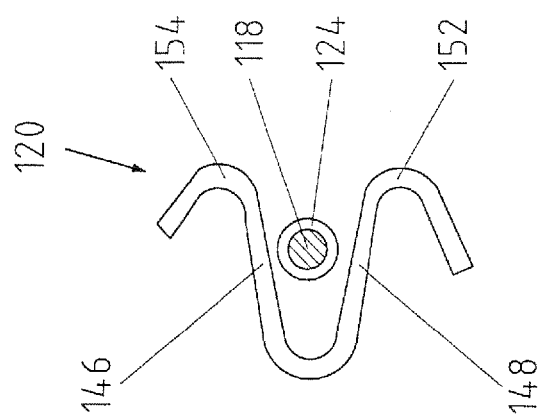

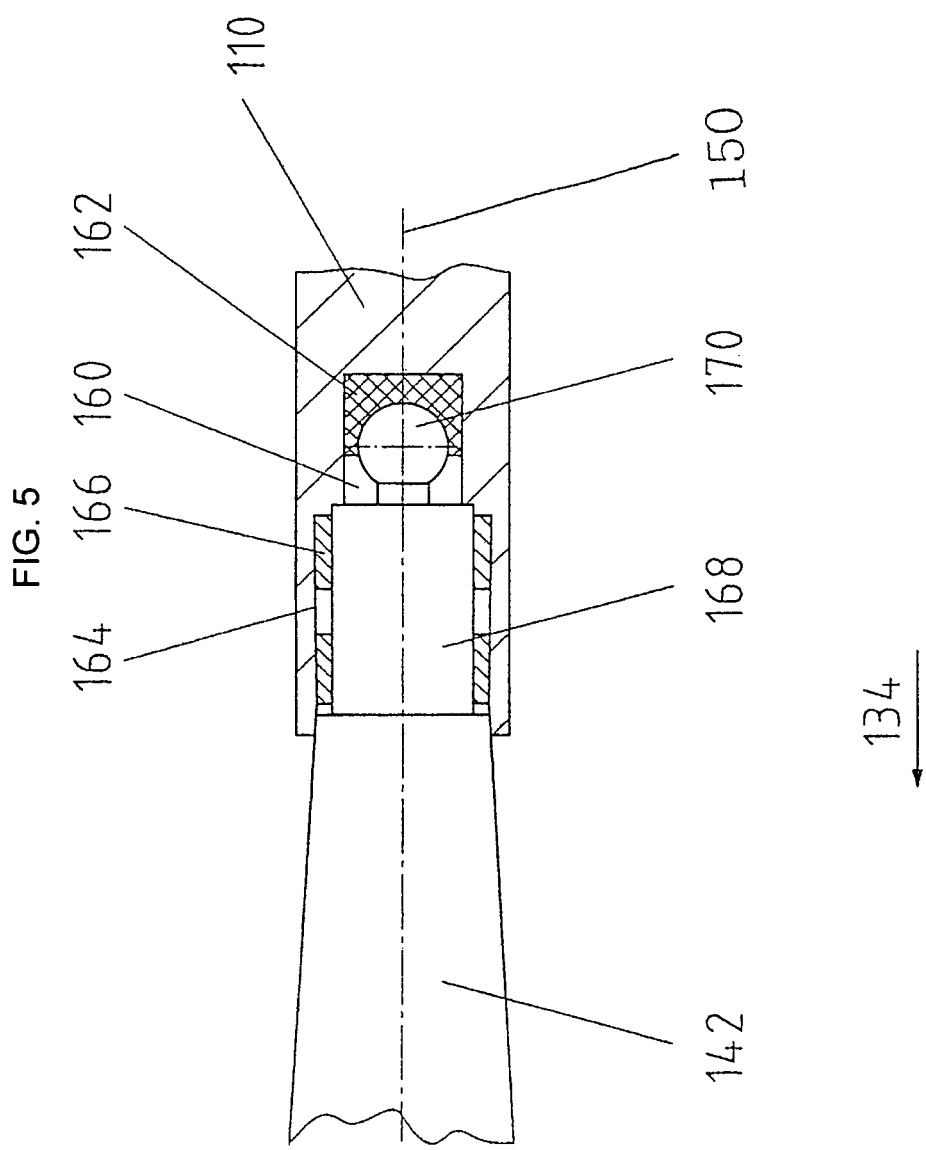

APPARATUS FOR PICKING UP AND GUIDING LOOPS

This application claims the benefit of German patent application serial number 103 32 330.9-22, filed Jul. 16, 2003, and is hereby incorporated by reference.

TECHNICAL FIELD

The invention concerns an apparatus for picking up and guiding loops (loop pick-up) or the like which can be applied to articles, in particular sausage-shaped packs, comprising a loop feed means, an angled pick-up means having a front end, a pin which has a contact surface and which is movable between a first position in which it passes through the fed loop and in which the contact surface is in contact with the front end of the pick-up means, and a second position away from the front end of the pick-up means, and a drive for actuation of the contact pin.

BACKGROUND OF THE INVENTION

As is known it is the usual practice in sausage production for the filling of a sausage which is to be formed to be conveyed by way of a filling tube into a tube-like or bag-like packaging material which is closed at one end. After the filling operation is concluded a twisted braid portion which is free of filling material is formed by means of two members referred to as displacer plates. Two closure means, referred to as clips, are then applied to that braid portion, and close the packaging material on both sides of the braid portion. Thereafter that portion is severed therebetween. If the sausage is later to be hung up for example for the purposes of smoking or storage, for example a suspension loop is fed thereto in such a way that, when the clip is fitted, it is embraced by the clip and is thus secured to the sausage.

The term loops in accordance with this invention is used to denote all at least partially flexible means, by way of which articles can be hung up.

Many sausage products are subsequently subjected to further processing for example in a smoking chamber. For that purpose the sausages have to be hung up individually and separately at their loops in such a way that as far as possible they do not touch each other. The degree of automation is not very far advanced in this field so that at the present time sausages are still hung on smoking rails by hand.

An exception is afforded by the apparatus which is set forth in the opening part of this specification and which is known from DE 34 37 830 or DE 38 06 467 and by means of which the loops are automatically and securely caught by the pick-up means which for example is in the form of a bar or blade. In order to guarantee suitable positive guidance, the pin or stud which can be moved to the pick-up means from below comes into contact with the front end thereof as soon as a loop which has been fed thereto is positioned in such a way that the pin passes through it upon movement thereof into the contact position (first position). The holding loop is then pulled onto the pick-up means by a downward movement of the sausage hanging from the loop, over a direction-changing roller. At its rear end the pick-up means is rotatably pivoted to an endless chain which circulates in a vertical plane and to which the loop is transferred by way of a slider movable pneumatically along the pick-up means. When the chain is filled over a given region of its total length, a 180° pivotal movement of the chain drive about the longitudinal axis thereof is implemented, whereby a smoking rail which embraces the previously lower half of the chain is pivoted upwardly so that the loops are transferred from the previously upper half of the chain onto the smoking rail and comes to lie thereon. As the pick-up means may not be moved with the chain drive, it is supported at pairs of piston-cylinder units arranged at both sides of the pick-up means. In that situation there is only one respective piston-cylinder unit of each pair in engagement with the pick-up means while the second is retracted in order to clear the path for the loop transported by way of the pick-up means. After contact is triggered the respective other piston unit of each pair then comes into engagement with the pick-up means while the first is retracted to clear the path.

A disadvantage with an apparatus of that nature is that the configuration and actuation both of the slider with means for transfer of the sausage supplied by the pick-up means onto the chain and also of the support for the pick-up means require a high level of complication and expenditure. In addition the movements thereof slow down the conveying process.

SUMMARY OF THE INVENTION

Therefore the object of the invention is to provide an apparatus of the kind set forth in the opening part of this specification, which is simple in terms of its design configuration and which guarantees reliable and damage-free transport of the articles.

That object is attained by an invention of the kind set forth in the opening part of this specification, wherein there is provided a torque support means in the region of the front end of the pick-up means and the contact surface of the pin has means for centering the pick-up means in such a way that the pick-up means does not bear against the torque support means when the pin is in the first position.

Such a torque support means provides that, while the pin is in the second position and thus does not bear against the front end of the pick-up means, the pick-up means is secured to prevent rotation thereof, in particular when—as is known from the state of the art—it is rotatably mounted with its rear end to a transport means which adjoins in the conveying direction. More specifically in that phase the pick-up means, with its front region which is angled with respect to its rear end, bears against the support means. When now a loop is threaded on by the pin being displaced into the first position and in so doing passing through the loop, the centering means at its contact surface serve to move the pick-up means into a defined position and at the same time to secure it to prevent rotational movement.

In that phase, the contact surface, with the centering means, takes over the function of the torque support means. The latter and the pick-up means can therefore be moved away from each other, at the same time or in time-displaced relationship. In that way the loop can slide along the bar without the torque support means obstructing the transport path thereof.

The movement of the components away from each other can be implemented in various ways: preferably the torque support means is formed by a fork embracing the pick-up means in the region of the front end thereof, the fork having a spread whose shape and width are so selected that the pick-up means does not bear against the fork when the pin is in the first position. In this embodiment, the contact position of the pick-up means in which it bears against the torque support means is displaced with respect to the centering position of the pick-up means. The centering action which is completed while the pin is moving towards the front end of the pick-up means causes the pick-up means to be guided away from the torque support means. In that respect consequently the width of the fork spread is so selected that the front end of the pick-up means has sufficient play therein so that the loop can be guided through the gap which occurs upon centering on both sides between the pick-up means and the fork.

In accordance with another embodiment the torque support means is adapted to be movable so that either together with the pin or separately while the pin is moving towards the tip of the bar or shortly thereafter the torque support means is movable or pivotable away from the support position with the bar. Preferably in that case the torque support means in the form of a fork is coupled to the pin in such a way that it is movable with the pin between the first and second positions, wherein the pick-up means at the position at which the fork is disposed while the pin has reached the first position is of a smaller cross-section than the width of the fork spread and at the position at which the fork is disposed while the pin has reached the second position it is of a cross-section which corresponds to the width of the fork spread.

This measure also provides that, when the pin passes through the loop, a gap is formed on both sides between the pick-up means and the fork, and this ensures that the loop can be guided along the pick-up means through that gap past the fork without becoming caught at the latter. In addition this embodiment has the advantage that the pick-up means, while the pin is in the second position, is clamped fast or held at least almost without play by virtue of the larger cross-section in the fork. As a result the pick-up means in the centering operation performs at most a slight lateral movement and the centering means are less susceptible to wear.

In another preferred embodiment the torque support means—once again in the form of a fork—is mounted with the pin pivotably about a common axis of rotation in such a way that the pin is in the first position while the torque support means is pivoted away from the pick-up means and that the pin is in the second position while the torque support means is pivoted to the pick-up means. A (pivotal) movement between the common first and the common second positions has the advantage over a linear movement that, with a suitable relative arrangement of pin, fork and axis of rotation and a suitable fork spread, the fork is pivoted away from the pick-up means—and thus clears the path for the loop—when the pin is in the first position without the pick-up means having to be tapered at a location corresponding to the fork seating. When the pin is pivoted away for feeding the next loop, at the same time the fork is pivoted towards the pick-up means and fixes same.

In these embodiments the fork-shaped configuration is not necessarily prescribed. It is found to be advantageous however as it provides that the loop can be guided through it at the same time while it is drawn onto the pick-up means, when the sausage secured thereto is being transported away. That effect is still further improved by the fork being bent open at its open end in such a way that the loop is prevented from being threaded onto the fork itself or on other projections.

In a preferred embodiment the tip of the bar is in the shape of a spherical segment and the contact surface has a configuration in the shape of a ball socket, as the centering means. Alternatively the tip of the bar can be of a conical configuration and the contact surface can be of a correspondingly funnel-shaped configuration.

The pick-up means (in this case referred to hereinafter after the bar) is preferably of a substantially round cross-section which enlarges from the front end (referred to hereinafter as the tip of the bar) in the direction towards the rear end opposite thereto (end remote from the tip of the bar). That is useful if for example a transport shaft which coaxially adjoins the rear end of the pick-up means and to which the loop is transferred from the pick-up means for further transport is of a larger diameter than the tip of the bar so that the loop does not become caught on a step upon transfer to the shaft.

So that the bar can be pivotably connected, for example, to the rotating transport shaft or to another pivotable transport device as is known for example from DE 34 37 830, it has at its rear end a rotary bearing substantially coaxial with its central axis.

BREIF DESCRIPTION OF THE DRAWINGS

Figure 2:
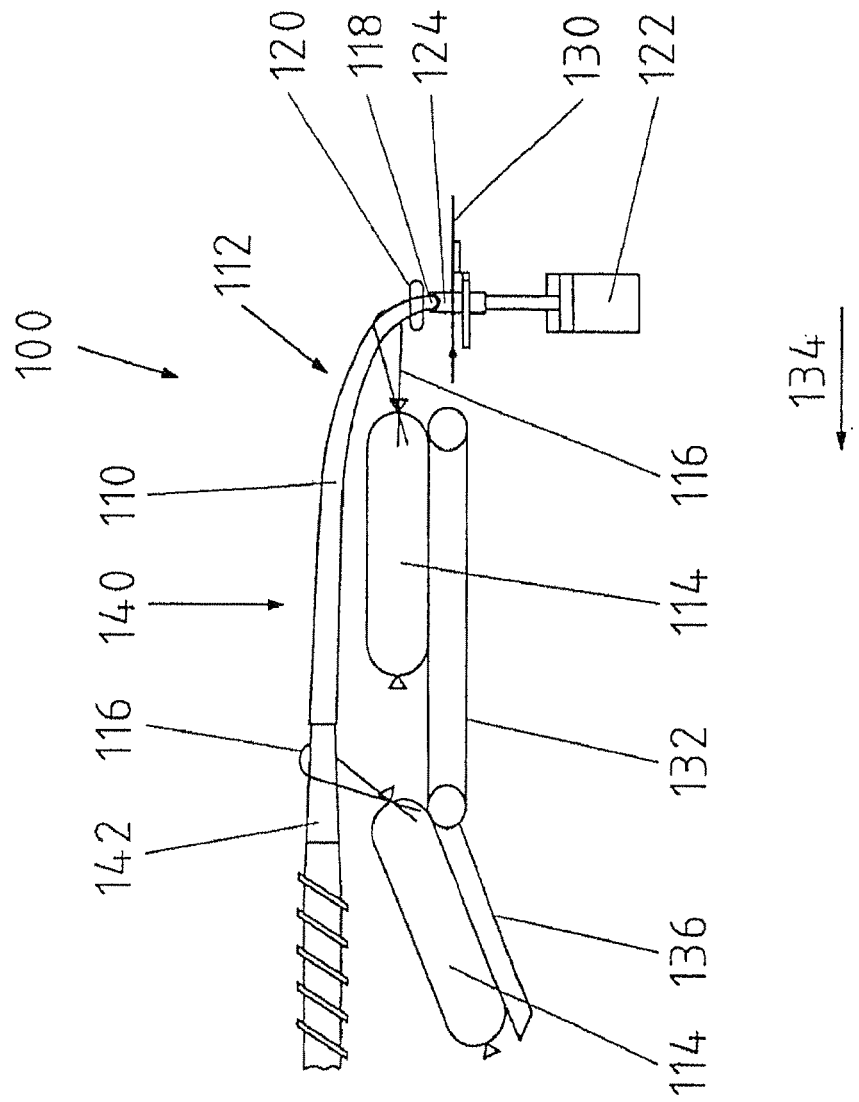

Further objects, features and advantages of the invention will now be described in greater detail by means of an embodiment with reference to the drawings in which:

FIG. 1 shows a plan view of an embodiment of the loop pick-up arrangement according to the invention, FIG. 2 shows a side view of the loop pick-up arrangement of FIG. 1, with a punch in a first position of passing through a fed loop, FIG. 3 shows a side view of the loop pick-up arrangement of FIGS. 1 and 2, in which the punch is in a second position, FIG. 4 shows a detail view of a torque support means in accordance with the embodiment of the loop pick-up arrangement shown in the preceding Figures, and FIG. 5 shows a partly sectional view of an axial rotary bearing arrangement at the discharge end of the loop pick-up arrangement.

DETAILED DESCRIPTION OF THE INVENTION

The embodiment of a loop pick-up arrangement 100, as shown in FIGS. 1 through 3, has a pick-up means or bar 110 of substantially circular cross-section. The bar 110 is angled arcuately downwardly in its front region 112. The contour of the angled front region 112 is so selected that, when a loop 116 which is fixed to a sausage 114 is pulled on, the lowest possible resistance is opposed to the loop so that the loop is reliably transported away in a damage-free condition, with the sausage.

The loop pick-up arrangement 100 also has, in the region of the tip 118 of the bar 110, a torque support means 120 which is curved in a forked configuration and the shape and mode of operation of which will be described hereinafter with reference to FIG. 4.

Shown below the tip 118 of the bar is a pin 124 driven by means of a pneumatic cylinder unit 122. At its contact surface 126 the pin has a centering means in the form of a ball socket, into which the tip 118 of the bar which is in the form of a segment of a sphere fits when the pin 124 is moved upwardly by the pneumatic cylinder unit 122, see FIG. 2. In that situation the tip 118 of the bar 110 is centered. At the same time, in the upward movement, the pin 124 passes through a loop 130 which is fed by means of a loop feed means 128 and which is positively guided by the positively locking engagement between the pin 124 and the tip 118 of the bar 110, and can no longer slip off the bar 110.

In the illustrated embodiment disposed laterally beneath the bar 110 is a conveyor belt 132 and, therebehind in the transport direction identified by an arrow 134, a chute 136.

The mode of operation of the embodiment illustrated here of the loop pick-up arrangement 100 is described hereinafter. The loops 130, which are fed by means of the loop feed means 128, are typically fixed on a holding and conveyor belt 138 which is conveyed together with the loops 130 by means of the loop feed means 128 stepwise in succession into a position perpendicularly beneath the bar 110. When the loop 130 is in that position, the pin 124 is displaced upwardly until its contact surface 126 comes into contact with the tip 118 of the bar 110. At the same time, a filling machine (not shown) which is disposed at an upstream position in the transport direction 134, introduces tubular packaging material which is closed at one end, so that a sausage is formed in the transport direction. At the end of that filling operation, a clip is fitted onto a braid portion of the sausage, which is free from filling material, by means of a closure machine (also not shown) disposed downstream of the filling machine. The clip at the same time passes through the fed loop 116 which is disposed in the central position, and thereby secures it to the braid portion of the sausage. Thereafter, the packaging material is severed at the braid portion and the sausage, which in the filling operation comes to lie with its front end in the transport direction 134 on the conveyor belt 132, is moved in the transport direction 134. As a result, moving along the curve formed by the angled front region 112 of the bar 110, the loop is firstly pulled upwardly a little and then pulled onto the bar 110 in the transport direction 134. When the sausage 114 reaches the end of the conveyor belt 132 it slides over the chute 136, under the effect of the force of gravity, whereby the loop 116 is drawn from a rear region 140 of the bar 110 for example as shown here onto an adjoining transport shaft 142. Transport shaft 142 transfers loop 116 along shaft 142 away from bar rear region 140. A novel transport apparatus, useable with the present invention as transport shaft 142, is disclosed in co-owned U.S. patent application Ser. No. 10/892,391, filed Jul. 15, 2004, entitled Transport Apparatus for Transporting Articles Hanging on Loops, which is hereby incorporated by reference.

As the shaft 142 rotates for further transportation of the sausage 114 hanging therefrom, the bar 110 remains stationary. Consequently, the bar 110 on the one end has to be connected rotatably to the shaft 142, while on the other end the bar 110 must be supported to prevent entrainment.

The torque support effect is afforded by way of the abovementioned fork 120 which is arranged in the region of the tip 118 of the bar 110, embracing the bar, as can be seen from FIG. 4. Fork 120 includes a pair of legs 146, 148. When the pin 124 is in the second position which is away from the tip of the bar and which is shown in FIG. 3, the tip 118 of the bar bears in the direction of rotation against one of the two legs 146, 148 of the fork 120. When the pin 124 is moved into the first position in which it is in engagement with the tip 118 of the bar, that causes centering of the bar so that, as shown in FIG. 4, it is disposed centrally between the legs 146, 148 of the fork 120. The gap which occurs on both sides by virtue of the selected width of the spread of the fork between the tip 118 of the bar and the legs 146, 148 of the fork, is sufficiently great that the supplied loop 130 can be guided upwardly along the tip 118 of the bar as it is drawn onto the bar 110 without the fork 120 obstructing the transport of the loop 130 when the sausage 114 secured thereto is being transported away from front end 112. In that situation the two rounded configurations 152, 154 on curved open ends of the fork 120 provide for a funnel-shaped enlargement of the fork so that the supplied loop 130 is centered when it is pulled up over the bar 118 and does not slide outwardly over the ends of the fork and become unintentionally threaded thereon.

For rotatably connecting the bar 110 the bar, at its rear end (discharge end), has a part-elastic ball socket 162 which is let into a first bore 160, as an element for securing it to prevent axial relative movement between the bar 110 and the shaft 142. Plain or roller bearings 166 are also fitted into a second bore 164 in coaxial relationship with the central axis 150 of the bar 110 as a rotary bearing element. As a counterpart thereto, the shaft 142, at its feed end, is provided with a cylindrical portion 168 to provide for radial support while at the outermost feed end it is provided with a ball 170 which as a counterpart portion latches into the partly elastic ball socket 162 and thus secures the bar 110 to prevent axial relative movement. Other forms of rotary bearings and axial securing means can equally be provided. In particular the arrangement of the elements as between the pick-up means and the shaft can also be interchanged so that the pick-up means is provided with a corresponding cylindrical portion as the rotary bearing element and with a ball as an element for preventing axial relative movement.

It will be seen from FIG. 1 that the bar 110 increases in its cross-section from its front region 112 in the transport direction 134 to its rear region 140. That provides that the diameter at the rear end of the bar on the one hand is sufficiently large to fit the bearings 166, 162. On the other hand, in its movement in the transport direction, the loop 116 which is pulled onto the bar drops from the larger periphery of the bar 110 onto the smaller periphery of the adjoining shaft 142 and thus does not remain caught for example at a step in the transport direction, in the region of the transition. In a modified embodiment the cross-section of the bar at its rear end can also be just as large as the adjoining shaft.

In one embodiment, the tip 118 of the bar 110 is in the shape of a spherical segment and the contact surface 126 has a configuration in the shape of a ball socket, as the centering means. Alternatively the tip 118 of the bar 110 can be of a conical configuration and the contact surface 126 can be of a correspondingly funnel-shaped configuration.

What is claimed is:

1. A pickup apparatus for use with sausage packaging machines having a loop feed means for transporting loops, the pickup apparatus comprising:
   a non-rotating pickup having a first portion extending in a transport direction, said first portion connected to a pickup end, said pickup end directed at an angle with respect to the transport direction;
   a moveable pin movable vertically between a first position adapted to extend through a transported loop and adapted to engage the pickup end and a second position distal the pickup end;
   a torque support defining a cavity in which the pickup end is positioned, the torque support adapted to selectably engage the pickup end; and
   the moveable pin having a contact surface adapted to engage the pickup end in such a way that the pickup end does not bear against the torque support when the moveable pin is in the first position, and wherein the torque support being a horizontally extending fork which selectively embraces the pickup end, the fork having a spread whose shape and width are so selected that the pickup end does not bear against the fork when the moveable pin is in the first position.

2. The pickup apparatus of claim 1, further comprising a rotating shaft engaging the first portion of the non-rotating pickup.

3. A pickup apparatus for use with sausage packaging machines having a loop feed means for transporting loops, the pickup apparatus comprising:
   a non-rotating pickup having a first portion extending in a transport direction, said first portion connected to a pickup end, said pickup end directed at an angle with respect to the transport direction;
   a moveable pin movable vertically between a first position adapted to extend through a transported loop and adapted to engage the pickup end and a second position distal the pickup end;

a torque support defining a cavity in which the pickup end is positioned, the torque support adapted to selectably engage the pickup end; and the moveable pin having a contact surface adapted to engage the pickup end in such a way that the pickup end does not bear against the torque support when the moveable pin is in the first position, where the torque support extends horizontally partially around the pickup end.

4. The pickup apparatus of claim 3, further comprising a rotating shaft engaging the first Portion of the non-rotating pickup.

5. A pickup apparatus for use with sausage packaging machines having a loop feed means for transporting loops, the pickup apparatus comprising:

a non-rotating pickup having a front end extending downward therefrom;

a moveable pin movable vertically between a first position extending through a transported loop and engaging the pickup front end and a second position distal the pickup front end; and a torque support positioned about the pickup front end, the torque support selectively engaging the pickup front end, the torque support being a horizontally extending fork which selectively embraces the pickup front end, the fork having a spread whose shape and width are so selected that the pickup front end does not bear against the fork when the moveable pin is in the first position, the moveable pin having a contact surface engaging the pickup front end is such a way that the pickup front end does not bear against the torque support when the moveable pin is in the first position.

6. The pickup apparatus of claim 5, further comprising a rotating shaft engaging a back end of the non-rotating pickup.

7. The pickup apparatus of claim 5 where the torque support extends horizontally partially around the pickup front end.

8. A pickup apparatus for use with sausage packaging machines having a loop feed means for transporting loops, the pickup apparatus comprising:

a non-rotating pickup having a front end extending downward therefrom;

a moveable pin movable vertically between a first position extending through a transported loop and engaging the pickup front end and a second position distal the pickup front end; and a torque support positioned about the pickup front end, the torque support selectively engaging the pickup front end, the torque support extending horizontally partially around the pickup front end, the moveable pin having a contact surface engaging the pickup front end is such a way that the pickup front end does not bear against the torque support when the moveable pin is in the first position.

9. The pickup apparatus of claim 8, the torque support being a horizontally extending fork which selectively embraces the pickup front end, the fork having a spread whose shape and width are so selected that the pickup front end does not bear against the fork when the moveable pin is in the first position.

10. The pickup apparatus of claim 8, further comprising a rotating shaft engaging a back end of the non-rotating pickup.

* * * * *